United States Patent
Buff

(10) Patent No.: US 11,549,698 B2
(45) Date of Patent: Jan. 10, 2023

(54) HEAT EXCHANGER ELEMENT AND METHOD FOR ITS MANUFACTURE; BUILDING PANEL AND METHOD FOR DEHUMIDIFYING AIR

(71) Applicant: Ullrich Buff, Crossen an der Elster (DE)

(72) Inventor: Ullrich Buff, Crossen an der Elster (DE)

( * ) Notice: Subject to any disclaimer, the term of this patent is extended or adjusted under 35 U.S.C. 154(b) by 0 days.

(21) Appl. No.: 16/639,718

(22) PCT Filed: Aug. 17, 2018

(86) PCT No.: PCT/EP2018/072362
§ 371 (c)(1),
(2) Date: Feb. 17, 2020

(87) PCT Pub. No.: WO2019/034789
PCT Pub. Date: Feb. 21, 2019

(65) Prior Publication Data
US 2020/0232663 A1 Jul. 23, 2020

(30) Foreign Application Priority Data

Aug. 18, 2017 (DE) .......................... 102017118977.7
Apr. 17, 2018 (DE) .......................... 202018102124.9

(51) Int. Cl.
*F24D 19/10* (2006.01)
*F24D 3/08* (2006.01)
(Continued)

(52) U.S. Cl.
CPC ............ *F24F 5/0089* (2013.01); *F24D 3/148* (2013.01); *F24F 13/222* (2013.01); *F28F 3/00* (2013.01)

(58) Field of Classification Search
CPC .......... F24D 3/148; F24D 3/142; F24D 3/141; F24F 5/0089; F24F 13/222; F24F 5/0092;
(Continued)

(56) References Cited

U.S. PATENT DOCUMENTS 1,800,150 A * 4/1931 Musgrave ............. F25D 23/061
29/890.035
4,646,814 A 3/1987 Fennesz
(Continued)

FOREIGN PATENT DOCUMENTS

DE 3941618 A1 * 6/1991 ............ F24F 5/0092
DE 3941618 A1 6/1991
(Continued)

OTHER PUBLICATIONS

German Office Action + English Translation for German Application 102017118977.7 dated Dec. 13, 2019. 17 pages.
(Continued)

*Primary Examiner* — Frantz F Jules
*Assistant Examiner* — Martha Tadesse
(74) *Attorney, Agent, or Firm* — Steinfl + Bruno LLP

(57) ABSTRACT

A heat exchanger element has a heat-conducting body and a heat-transfer fluid pipe embedded in ducts having a channel-shaped locating section and two tabs connected flat to the heat-conducting body. To produce the heat exchanger element, foil strips are pressed into grooves so that they each form a section pressed into the grooves in a channel-like manner and laterally projecting tabs. A building panel has a heat exchanger element with a heat exchange surface, a cooling device and a collecting device, the cooling device being designed to cool the heat exchange surface in contact with the ambient air to a temperature below the dew point of the water vapour in the ambient air.

6 Claims, 10 Drawing Sheets

Figure 1:
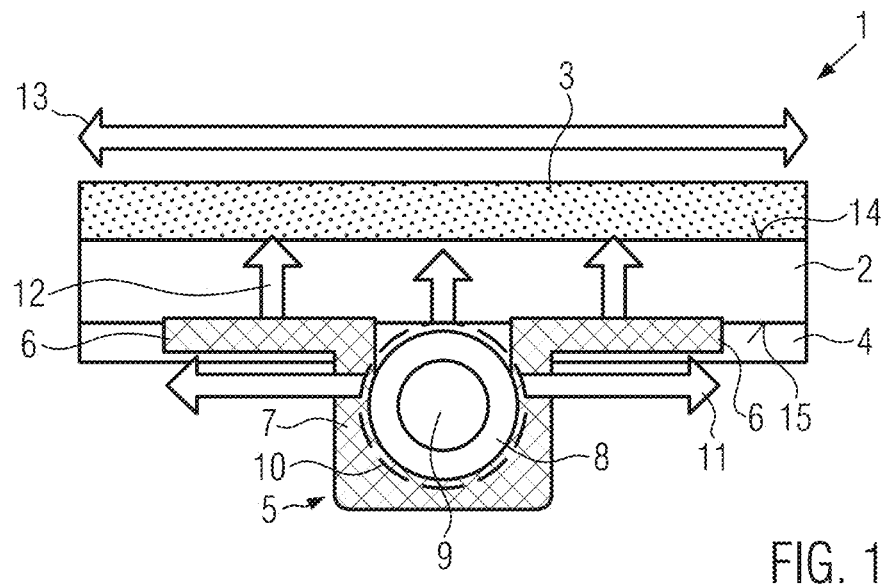

(51) Int. Cl.
*F24D 3/10* (2006.01)
*F24F 5/00* (2006.01)
*F24D 3/14* (2006.01)
*F24F 13/22* (2006.01)
*F28F 3/00* (2006.01)

(58) Field of Classification Search
CPC ....... F28F 3/00; F28F 2275/025; Y02B 30/00; B21D 53/08; F25D 23/061; B23P 15/26
See application file for complete search history.

(56) References Cited

U.S. PATENT DOCUMENTS

| | | | |
|---|---|---|---|
| 4,653,729 A | | 3/1987 | Ando |
| 6,001,198 A | * | 12/1999 | Habisreitinger ........ B65B 41/14 156/212 |
| 8,899,055 B2 | | 12/2014 | Kuenzel et al. |
| 2003/0218075 A1 | | 11/2003 | Muir |
| 2009/0101306 A1 | | 4/2009 | Reis et al. |
| 2009/0314848 A1 | | 12/2009 | Andersson |
| 2015/0136361 A1 | * | 5/2015 | Gregory ............... F24D 3/146 165/104.19 |

FOREIGN PATENT DOCUMENTS

| | | | | | |
|---|---|---|---|---|---|
| DE | 4216136 | A1 | | 11/1993 | |
| DE | 29801644 | U1 | | 4/1998 | |
| DE | 10214181 | A1 | | 10/2003 | |
| DE | 202006006872 | U1 | | 7/2006 | |
| DE | 102005034141 | A1 | | 1/2007 | |
| DE | 102007028451 | A1 | | 12/2008 | |
| DE | 202008013961 | U1 | | 3/2010 | |
| DE | 202010010564 | U1 | | 10/2010 | |
| DE | 102009000612 | A1 | * | 12/2010 | ............ F24D 3/141 |
| DE | 102010018162 | B3 | | 10/2011 | |
| DE | 102012014827 | A1 | | 5/2014 | |
| DE | 102013008717 | A1 | * | 8/2014 | ............ F24J 2/242 |
| DE | 202014101786 | U1 | | 7/2015 | |
| DE | 102014014828 | A1 | | 4/2016 | |
| DE | 202017101128 | U1 | | 5/2018 | |
| EP | 1843103 | A2 | | 10/2007 | |
| EP | 2538148 | B1 | | 11/2014 | |
| EP | 3029387 | A1 | | 6/2016 | |
| EP | 3109559 | A1 | * | 12/2016 | ............ E05D 15/58 |
| EP | 3109559 | A1 | | 12/2016 | |
| EP | 3109559 | B1 | | 8/2020 | |
| JP | H11270862 | A | | 10/1999 | |
| JP | 2006038303 | A | | 2/2006 | |
| JP | 2008122014 | A | | 5/2008 | |
| JP | 2009052778 | A | | 3/2009 | |
| JP | 2009300051 | A | | 12/2009 | |
| JP | 4803120 | B2 | | 10/2011 | |
| JP | 2014062672 | A | | 4/2014 | |
| JP | 2014062672 | A | * | 4/2014 | |
| WO | 2007/139370 | A1 | | 12/2007 | |
| WO | 2010/144841 | A1 | | 12/2010 | |
| WO | WO-2012010272 | A1 | * | 1/2012 | ............ E04B 5/48 |

OTHER PUBLICATIONS

German Office Action + English Translation for German Application 102017118977.7 dated Feb. 19, 2018. 9 pages.
German Research Report + English Translation for German Application No. 202018102124.9 filed on Apr. 17, 2018 on behalf of HGF Europe LLP, dated Apr. 25, 2019. 5 pages.
International Search Report + English Translation for International Application No. PCT/EP2018/072362 filed on Aug. 17, 2018 on behalf of Ullrich Buff, dated Mar. 4, 2019. 10 pages.
Invitation to Pay Additional Fees, Where Applicable, Protest Fee + English Translation for International Application No. PCT/EP2018/072362 on behalf of Ullrich Buff, dated Nov. 13, 2018. 21 pages.
Written Opinion + English Translation for International Application No. PCT/EP2018/072362 filed on Aug. 17, 2018 on behalf of Ullrich Buff, dated Mar. 4, 2019. 21 pages.
Singaporean Office Action for SG Application No. 11202001456P filed on Aug. 17, 2018 on behalf of Ullrich Buff dated May 5, 2021 7 pages.
Action for Second Office Action for SG Application No. 11202001456P filed on Aug. 17, 2018 on behalf of Ullrich Buff dated Apr. 26, 2022; 7 pages.
EPO Communication Article 94 (3) for EP Application No. 18759076.5 filed on Aug. 17, 2018 on behalf of Ullrich Buff dated Mar. 24, 2022, 12 pages (English + Original).

* cited by examiner $$E(T) = 6.112 \, hPa \cdot \exp\left(\frac{17.62 \cdot T}{243.12\,°C + T}\right) \text{ for } -45\,°C \leq T \leq 60\,°C$$

E = Saturation vapour pressure
T = Temperature

FIG. 15

HEAT EXCHANGER ELEMENT AND METHOD FOR ITS MANUFACTURE; BUILDING PANEL AND METHOD FOR DEHUMIDIFYING AIR

This invention concerns a heat exchanger element and a process for its manufacture. The invention also concerns a building panel and a process for dehumidifying air.

For temperature control, i.e. heating and cooling, of buildings it is known to use heat exchanger elements which are designed and pre-assembled as ceiling panels or wall panels, for example. Copper pipes are often meander-shaped, laid in long parallel sections with short end reversal/connector sections on heat conduction plates.

The basic problem is the cost- and material-optimised distribution or dissipation of heat to or from a large surface. This is intended to ensure that a liquid, e.g. water as an efficient heat transfer medium, can be used to operate as large an area as possible evenly and with a high heat supply or discharge capacity, while at the same time minimising material consumption and weight. The heat exchange can take place via heat radiation, convection or heat conduction.

Previous systems use for this purpose heat conducting plates made of metallic materials, e.g. steel or aluminium, which are clipped around the relatively large pipe cross-section of up to 20 mm. The construction is used in particular in composite elements of cooling or heating ceiling constructions. These use the heat radiation exchange for the provision of a high cooling or heating capacity. For this purpose, a particularly evenly and effectively tempered surface with a high heat transfer coefficient is required. To achieve this, metal sheets are prefabricated to the required size or cross-section. For this purpose, post-formed or extruded profiles with a wall thickness of approx. 1 mm or more are used. Then the pipes are drawn into these, which transfer heat to the plastic pipe via the wall. The heat conducting plates, which are adapted to the copper tube, usually have thicknesses of about 1 to 3 mm. This is due to the relatively large pipe spacing and the associated heat conduction in a solid medium.

A problem of these systems is the high material consumption, the high weight and the relatively uneven two-dimensional heat distribution, which is characterized by a waviness in the temperature profile. In thermal images of such elements, the individual stripes of the metal fins are visible. These show insufficient uniformity and heat distribution at the edges.

Moisture loads in buildings are achieved by air-based processes, usually by cooling on cooled heat-conducting fins and subsequent condensate removal. By cooling down the relatively large surface of the heat conducting fins, air temperature drops below the dew point and condensate runs off at the fins. The disadvantage of this process is that the air transports unavoidable amounts of pollutants and nutrients to form germs on the heat conduction fins. These are deposited on the fins and, in the event of inadequate maintenance, lead to considerable health hazards for the persons in the air-conditioned area. In addition, the necessary air movement requires an air exhaust and supply system, which is often associated with high electricity costs. Decentralised and stand-alone systems for individual rooms often have a high energy consumption and heat the room additionally due to dehumidification.

DE 102005034141 A1 describes a method in which a fountain is used which has liquid temperature below the dew point of the water vapour in the air. Water vapour therefore condenses on the water surface. The cooled water runs off over a wide surface if possible. One disadvantage of this fountain is the conspicuousness, which is only intensified by the running water. In addition, the open cooling system requires a great deal of maintenance. The water must be changed regularly, otherwise algae can easily form. The use of chlorine, alcohol or other anti-algae agents can in turn have a negative effect on the room climate.

There are also air dehumidifiers that contain an agent which absorbs or adsorbs water vapour. However, the performance is very limited and these "chemical" dehumidifiers can only be used in a locally limited area. In addition, the absorbent or adsorbent must be regularly replaced and/or regenerated, which in turn increases effort and costs.

One task of the invention is to create a heat exchanger element that achieves a more uniform surface temperature with little material and conventional materials and a high heat transfer with as simple and scalable processing and production as possible.

A further task is the creation of an advantageous manufacturing process for such a heat exchanger element.

A further task of the invention is to create a simple, non-air-based dehumidification element that does not require a complex and maintenance-prone cooling circuit, filters airborne particles and germs from the air, and is energy-efficient, cost-effective and low-maintenance.

One or more of the tasks are solved by the subject of one of the independent claims. Advantageous developments and preferred embodiments form the subject of the respective dependent claims.

From the point of view of the invention, a heat exchanger element with a heat-conducting body and a heat-transfer fluid pipe, which is connected to the heat-conducting body in a heat-conducting manner, is proposed, wherein the heat-transfer fluid pipe is embedded with heat-conducting contact in sections, preferably in parallel ducts made of heat-conducting material, wherein the ducts have a channel-shaped locating section and two tabs connected to the locating section so that the ducts are approximately Ω-shaped in cross-section, and wherein the tabs are flatly connected to the heat-conducting body in order to establish the heat-conducting connection of the heat-conducting fluid pipe with the heat-conducting body.

The ducts, which are approximately Ω-shaped in cross-section, can exchange heat over the entire inner surface of the locating section with the heat transfer fluid pipe and exchange heat with the heat transfer body via the tabs. This can also result in a better heat transfer.

The heat conduction element can be inherently rigid so that it gives the heat exchanger element stability.

The heat-conducting body can also be flexible, e.g. in the form of foil. When using flexible heat transfer fluid pipes, the heat exchanger element can therefore be flexible overall and, above all, rollable.

The heat conducting body in the embodiments has a heat transfer surface, which is a main surface of the plate component and is designed for heat exchange with an environment, and a mounting surface, which is a main surface of the plate component, the tabs being connected to the mounting surface, the mounting surface preferably facing away from the heat transfer surface. As already described above, a main surface in the sense of the invention is one of the two largest surfaces of a panel component, i.e. it is especially different from its edge surface. This design also achieves an advantageous functional division, and the heat transfer surface can be kept free from heat transfer pipes, which facilitates the design of the heat transfer surface, which can face an environment, such as a living space.

In the embodiments, the heat transfer fluid pipe is arranged meandering along the mounting surface. Sections of the heat transfer fluid pipe embedded in the locating sections of the ducts can be connected straight, preferably parallel to each other and preferably in one piece. With a meander-shaped arrangement, a good use of space can also be achieved. If the embedded sections are parallel to each other, only short reversal or connector sections are required, which are not embedded, thus ensuring heat transfer over the much longer embedded sections. A one-piece connection of the embedded sections can create good tightness and thus operational reliability. The one-piece heat transfer fluid pipe can also be prepared, for example, as a pipe mat or the like, which facilitates the manufacture of the heat exchanger element. As an alternative to the one-piece connection, connectors can also be provided, which, for example, are tightly connected to the embedded sections by means of material bonding or compression.

In the embodiments, the heat transfer fluid pipe is made of plastic. This is a proven and cost-effective design. Plastic is also easy to shape, which facilitates the production of an endless meander-shaped heat transfer fluid pipe with narrow reversing sections if necessary. At the same time, the use of plastic as a heat transfer fluid pipe makes particularly advantageous use of the invention due to its low intrinsic heat conduction. Examples of suitable plastics are polyvinyl chloride (PVC), polyethylene (PE), polypropylene (PP), cross-linked polyethylene (PEX) and various types of plastic composites.

In the embodiments, the inner contour of the ducts is adapted to the outer contour of the heat transfer fluid pipe and an opening width of the ducts is smaller in cross-section than an outer dimension of the heat transfer fluid pipe in cross-section. This allows the heat transfer fluid pipe to be dipped into the ducts, which also makes installation easy. Since the ducts are elastically pushed into the locating sections by the residual stress of the ducts, i.e. away from the plate component, and cannot press against the heat-conducting body due to their residual stress and elasticity, thereby stressing the connection between the heat-conducting body and the ducts, the installation is also particularly reliable.

In the embodiments, the tabs of the ducts are connected to the heat-conducting body via a heat-conducting adhesive or a heat-conducting bonding agent. This can further improve the heat transfer.

The ducts may be connected to the heat conducting body by press joining or forming joining. This can also achieve an even more direct heat transfer, and an adhesive or bonding agent can also be avoided or its effect supported.

In the embodiments, the ducts, in particular the locating sections of the ducts, are embedded in a carrier component with grooves which are adapted to an outer contour of the ducts. Such a carrier component can also improve the inherent stability of the heat exchanger element.

The carrier component is preferably an insulation board. With an insulation board as the carrier component, heat insulation is also possible on the "rear side", i.e. the mounting surface, of the heat conductor, which improves usability in air conditioning of buildings. The insulation board can also be designed diffusion-tight or diffusion-open, depending on the application or use. Examples are PUR insulation boards or mineral wool boards. This is intended to have a one-way effect, which can be particularly advantageous in air conditioning of buildings.

Such an insulation board preferably has a thermal conductivity of max. 1.0 W/mK and especially of max. 0.4 W/mK.

Due to the provision of an insulating panel, the heat exchanger element only has a heat transfer on one side, so that this heat exchanger element can also be described as a heat exchanger element that can be activated on one side. By the one-sided activation the heat exchanger element is suitable for fitting to thermally passive or non-tempered surfaces with the thermally unactivated side, like e.g. house walls. The purpose of a flat heat exchanger element is also, as already described, to distribute or absorb heat to or from large surfaces with as little material and resources as possible.

In the embodiments, the ducts have a wall thickness of at least about 10 µm and of at most about 100 µm, preferably at least about 15 µm and at most about 50 µm. Due to this design, the heat exchanger element also has a particularly low weight. The ducts can be made of foil, which requires little effort and little energy.

In alternative embodiments, the ducts have a wall thickness of at least about 0.5 mm and preferably at least about 0.8 mm. The maximum wall thickness shall be approximately 5 mm and preferably approximately 2 mm, in particular approximately 1 mm. In this design, the heat exchanger element has high inherent stability and heat conduction. The ducts may, for example, be made of an extruded aluminium profile. Such a profile could be produced economically in mass production and would then have the advantage that it conducts heat better than aluminium foil due to its greater wall thicknesses.

In its embodiments, the heat conductor has a wall thickness of at least about 10 µm and preferably at least about 15 µm. The heat conductor body can have a wall thickness of at most about 100 µm and in particular at most about 50 µm. Due to this design, the heat exchanger element also has a particularly low weight. The heat conductor can be made of foil, which requires little effort and little energy.

In alternative embodiments, the heat-conducting body has a wall thickness of at least about 0.5 mm and at most about 5 mm, preferably at least about 0.8 mm and at most about 2 mm, in particular at most about 1 mm. In this design, the heat exchanger element has high inherent stability and heat conduction.

The heat conduction element may have a heat emission-optimised and/or heat absorption-optimised coating on the heat transfer surface. This can further improve the heat transfer. The coating can, for example, be applied as paint, fleece, flocking or electrochemically.

Preferably the heat conduction body has a perforation or roughening. Such a design can have advantages with regard to acoustics, plastering or thermal as well as adhesion behaviour.

The heat conducting body may be coated with an ad- or absorptive material on the heat transfer surface. This also makes it possible to use the heat or cold for cost-effective, e.g. heat-driven refrigeration machines. Such an ad- or absorptive material can be zeolite or silica gel, for example. Such a design can be particularly advantageous for use in low-cost, solar- or heat-driven zeolite-based absorption chillers.

In the embodiments, the heat transfer surface of the heat conducting body is coated to protect it against physical or chemical environmental influences, which can have additional advantages in terms of operational safety and handling and assembly.

The coating can also have acoustic properties and, in particular, sound-insulating properties. Such a coating can be, for example, a textile, fleece, woven fabric, knitted fabric, elastic grid or a perforated, especially micro-perforated plate made of a heat-conducting material. The heat exchanger element can then be used both for temperature control of a room and to adjust the acoustics of the room.

A coating with such acoustic properties is particularly advantageous in combination with a flexible and above all rollable heat exchanger element.

The heat conductor can be at least partially permeable to air or gas or moisture. Such permeability can, for example, be produced by a lattice-like or honeycomb-like or perforated structure of the heat conductor. This also allows convective heat transfer through the heat conduction body and thus, for example, rear ventilation of the heat exchanger element.

The heat conductor and/or the ducts can be made of aluminium or copper or an alloy or composite material. These materials are known to have particularly good thermal conductivity, which further improves heat transfer.

According to another aspect of the invention, a method is proposed for manufacturing a heat exchanger element with a heat-conducting heat conductor body having a heat transfer surface and a heat transfer fluid pipe connected to the heat conductor body in a heat-conducting manner. The heat exchanger element may be designed as described above. According to the invention, the method has the following steps:

- arrangement of a thermally conductive foil on a template having grooves in such a way that the grooves are covered by the foil;
- using foil strips each covering a groove as the foil, or forming foil strips each covering a groove from the foil;
- pressing the film strips into the respective groove, the film strips being so wide that, after pressing-in, they each form a portion pressed into the grooves in the form of a channel together with tabs projecting laterally at the longitudinal edges of the grooves;
- inserting portions of a heat transfer fluid pipe into the channel-shaped portions of the foil strips pressed into the grooves; and
- connecting the tabs flat with a heat-conducting heat conductor.

The thermally conductive foil is preferably coated with a layer of thermally conductive adhesive. Other material bonding processes, in particular those which are thermally conductive, such as soldering or welding joints or similar, hot, cold, forming or permanently material bonding processes, can also be used.

This provides a simple and cost-effective method of manufacturing a heat exchanger element. Since the method produces a heat exchanger element with the features according to the above-mentioned aspect of the invention, the features and advantages mentioned in connection with the above-mentioned aspect of the invention and its embodiments are to be attributed directly or correspondingly to the method of this invention aspect.

In the embodiments, the foil strips are formed by pressing them into the grooves by tearing the foil longitudinally between the grooves at predefined locations, the predefined locations being preferably achieved by a weakening, in particular perforation, made in the foil before the foil is placed on the template. In other words, in this manufacturing process, a pre-perforated foil will tear when it is pressed into the grooves at the perforation, which makes the formation of the foil strips particularly simple and inexpensive.

In alternative embodiments, the foil strips are formed in the foil arranged on the template using a cutting tool, which is preferably integrated in a pressing tool for pressing the foil strips into the grooves.

In other alternative embodiments, the previously prepared foil strips are placed on the template, each covering a groove.

The foil or the pre-prepared foil strips can be picked up by a pressing tool to press the foil strips into the grooves, arranged on the template and then pressed into the grooves in one pull. The foil or foil strip can, for example, be picked up by a suction device in the pressing tool or by an adhesive on the pressing tool. With this process control, a combination of tool functions is also possible. An exact positioning of the foil or foil strip in relation to the pressing tool and the template is automatically given and does not have to be ensured separately. This also allows the manufacturing process to be further simplified, the number of cycles increased and the overall costs reduced.

The tabs of the ducts are preferably connected to the heat-conducting body using a heat-conducting adhesive or a heat-conducting bonding agent. The advantage is that the adhesive or bonding agent, may be applied to the heat-conducting body beforehand.

The ducts can be connected to the heat-conducting body by press joining or forming joining.

The template can be made of an elastically flexible material, whereby an opening width of the channel-shaped sections of the foil strips pressed into the grooves is smaller than an outer diameter of the heat transfer fluid pipe. With this type of production, channel-shaped sections of the foil strips can cling elastically to the pipe sections due to the counter-pressure of the template material. This also allows a particularly good heat transfer to be achieved. If the inlet opening springs back after the heat transfer fluid pipe has been pressed in, it can be held in the groove so that it cannot be lost.

In the embodiments, the template is made of a heat and/or sound insulating material and remains on the heat exchanger element as an insulating plate. Before it is placed on the template, the heat-conducting foil is provided with an adhesive or a bonding agent on a surface facing the template. This makes it particularly easy to produce a heat transfer fluid pipe with an insulating board as the supporting component.

The heat conducting body may have a heat transfer surface, which is a main surface of the heat conducting body and is designed for heat exchange with an environment, and a mounting surface, which is a main surface of the heat conducting body, the tabs being connected to the mounting surface, the mounting surface preferably facing away from the heat transfer surface. In addition to the advantages already mentioned with regard to the heat exchanger element, this process also has the advantage with regard to the method that the heat conducting body can remain on the template when connected by the tabs.

Preferably, the heat conduction element is coated on the heat transfer surface. The coating can be optimised for heat emission and/or heat absorption and/or designed to protect against physical or chemical environmental influences and/or have ad- or absorptive properties.

In the embodiments, the heat-conducting body has or is provided with a perforation or roughening and/or is partially permeable to air or gas or moisture, preferably through a grid-like or pierced or perforated structure of the heat-conducting body.

The heat-conducting body and/or foil or foil strips may be made of aluminium or copper or an alloy or a composite material.

The heat-conducting body and/or the foil or foil strips may each have a wall thickness of at least about 10 μm and at most about 100 μm, preferably at least about 15 μm and at most about 50 μm. In alternative embodiments, the heat-conducting body and/or the foil or foil strips each have or a wall thickness of at least about 0.5 mm and of at most about 5 mm, preferably at least about 0.8 mm and at most about 1 to 2 mm.

The heat transfer fluid pipe may be or be made of plastic. The heat transfer fluid pipe may have a wall thickness of at least about 0.2 mm, preferably at least about 0.5 mm, in particular at least about 1 mm. The heat transfer fluid pipe may have a wall thickness of not more than about 5 mm, preferably not more than about 1 to 2 mm.

In the embodiments, the heat transfer fluid pipe is meandering in design. The sections of the ducts pressed into the grooves of the template are preferably straight sections of the heat transfer fluid pipe. The heat transfer fluid pipe may be formed into a meandering shape from one piece before being pressed in, or may be assembled from straight sections and curved connector sections or pieces before being pressed in, or may be completed by attaching connector sections or pieces after preferably straight sections have been pressed in.

The heat conductor can be plate-shaped or substantially plate-shaped. In the sense of the invention, a plate-shaped component is one which is considerably larger in two spatial directions, i.e. by at least one, preferably at least about two to three, in practice also by four, five or more orders of magnitude, than in a remaining spatial direction, so that it has two extended main surfaces and circumferential edge surfaces. Thus, both flat cuboids and foils can be heat conducting bodies in the sense of the invention. The invention is also not limited to rectangular heat conducting bodies, rather the main surfaces of the heat conducting bodies can also be round, triangular, hexagonal or of another shape in plan view.

Furthermore, the heat-conducting body can consist of coated sheets, e.g. trapezoidal ceiling sheets or freely formed sheets, such as are known as PUR ceiling panels. Here the flexible pipe and the individual fins formed by the duct can cling to any contour and be thermally bonded to the sheet metal by the heat-conducting adhesive. In addition, the heat-conducting body can also consist of other materials such as gypsum plasterboard, wood-based material or fabric, whereby any thermally activated surfaces can be produced by the pipes and the adhesive connection.

The heat exchanger element can also have a frame or the like. Furthermore, light sources or the like can be integrated.

Furthermore, the heat exchanger element can be flexibly designed.

The heat conducting body can also be shaped in such a way as to cover almost any three-dimensionally shaped surface. This can be, for example, the roof of a motor vehicle. In addition to the function of cooling or heating a room, as described above, the heat conductor can be used as active insulation. For example, a wall to which the heat conductor is attached can be exposed to a source of heat or cold, e.g. a vehicle interior, in summer or winter. The cold or heat radiation is absorbed by the heat conductor and transported away. The temperature in the interior thus remains stable. An example would be a car standing in a desert climate. The roof temperature can quickly reach over 80° C., while the air temperature is only 30° C. Here, the excess high temperature heat above 30° C. can be dissipated to the ambient air very efficiently by a dry cooler on the vehicle. A dashboard arranged in the vehicle would be another possible application.

Another aspect of the invention is a building panel with a heat exchanger element with a heat exchange surface, a cooling device and a collecting device, which is designed in such a way that it can reduce the humidity of the surrounding air. For this purpose, the cooling device cools the heat exchange surface to a temperature below the dew point of the water vapour in the surrounding air. Thus the air humidity is reflected at the heat transfer surface. This precipitation can flow off as water droplets and take even more precipitation with it. A collecting device is provided, into which the water can flow off. The drop discharge contributes to an even temperature distribution. No costly and maintenance-prone open water or cooling circuit is required and thus there is a high saving for the user. The cold generation can be provided by a chiller, e.g. compression chiller, or by the cold water flow of the consumers. Applications here are, for example, service areas or public showers and washrooms in which high moisture loads and high water quantities are required. Due to the overlapping of mains cold water demand and high moisture load, the moisture can be removed from the room through the surface which is actively tempered by the cold mains water. In addition, the water heats up at the same time, which leads to a lower hot water heating requirement. In addition, the humidity load in the room is reduced, since the room air humidity condenses on the cooled surfaces and therefore no longer has to be removed by the air conditioning system.

It is advantageous if the building panel has an area of at least 1 $m^2$, 5 $m^2$ or at least 10 $m^2$. Optionally, the panel can be constructed in segments or modules. The larger the area, the more water vapour condenses at the same temperature. The area is proportional to the performance of the building panel. Thus a smaller difference to the room temperature can be selected with a large surface, whereby the room air is cooled little.

At the dew point, also called dew point temperature, the relative humidity is 100%. At constant pressure, the temperature of the air must be lower than the dew point so that the water vapour contained in the air can separate as fog or dew. The dew point can be calculated approximately using the Magnus formula (FIG. 15).

The cooling device is a device for cooling a fluid in the heat exchanger element of the building panel. The fluid cools the heat exchange surface. The cooling device can be different. For example, the cooling device may have a Peltier element or be designed so that the phase transition of a coolant, such as dry ice, cools the fluid. Other forms of cooling equipment can be a compression chiller or an absorption chiller.

It is advantageous if the building panel has a facing wall upstream of the heat exchanger element. This optically conceals the heat exchanger element. It also prevents direct contact with the wet and cold surface of the heat exchanger element. In addition, the wall can be painted and wallpapered as required. The hanging of pictures does not reduce the performance either. It is advantageous if the facing wall is arranged at least 5 cm, 10 cm or in particular 25 cm in front of the heat transfer surface.

The facing wall can be permeable to air, for example by consisting of a frame covered with fabric.

A gypsum plasterboard wall is particularly advantageous. Plasterboard is stable, easy to install and thermally insulating. For room air to reach the heat exchanger element, the facing wall must have at least one hole, preferably in the form of an air slot. Especially advantageous are at least two air slots, which are arranged at the top and bottom of the wall, so that the air can circulate along the heat exchanger element (reverse chimney effect).

It is advantageous if the side of the wall facing the heat exchanger element is coated with a special agent that prevents mould and algae growth. Optionally, the rear side of the facing wall can be coated with a highly reflective coating, e.g. aluminium foil. This prevents part of the heat from escaping from the facing and reduces the risk of falling below the dew point. For maintenance work, the facing shell can be hinged up or down in front of the element.

It is advantageous if there is a fan for at least one hole or slot, which either blows moist air into the cavity between the heat transfer surface and the facing wall or blows dry air out.

To enlarge the contact surface, it is advantageous if it has three-dimensional structures. This is provided, for example, by a corrugated or zigzag heat transfer surface. The heat exchanger element can also be equipped with fins.

Furthermore, the building panel can be designed so that the heat transfer surface is made of a durable material such as glass or metal to facilitate cleaning. Because of the moisture film, airborne particles and germs also precipitate on the activated surface. This cleans the air. The constant condensation of cooling and constant humidity prevents the formation of mould. As a rule, the surface is designed in such a way that simple cleaning or disinfection is possible.

In order to obtain better self-cleaning, whereby also the germ load is reduced, the coating can exhibit a super-hydrophobic surface by means of micro- and/or nano-structuring. In common usage such a structured surface has a lotus effect.

The surface can also be treated to have an antibacterial effect. This can be achieved, for example, by an aluminium silicate matrix, where ambient moisture activates various metal ions that prevent the formation and growth of bacteria and fungi. An alternative is titanium dioxide, which triggers a photo-catalytic process that oxidizes microorganisms such as bacteria, viruses and fungi in the area close to the surface.

Even tiny particles such as dust and bacteria are washed away. The heat transfer surface cleans itself automatically. The effect here is analogous to coatings on PV cells.

In addition, the collection container can be designed in such a way that it is connected to a domestic water drain and/or water recovery system and/or designed in such a way that it can be transported and emptied. It is also possible to operate the water connection for cleaning only temporarily on the surface. This removes the precipitated suspended particles and deposits.

Figure 2A:
Figure 2B:
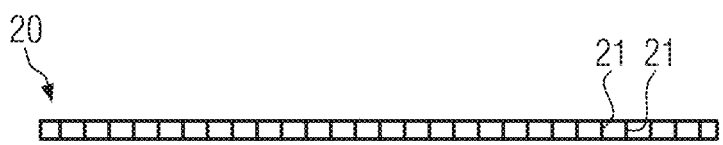
Figure 2C:
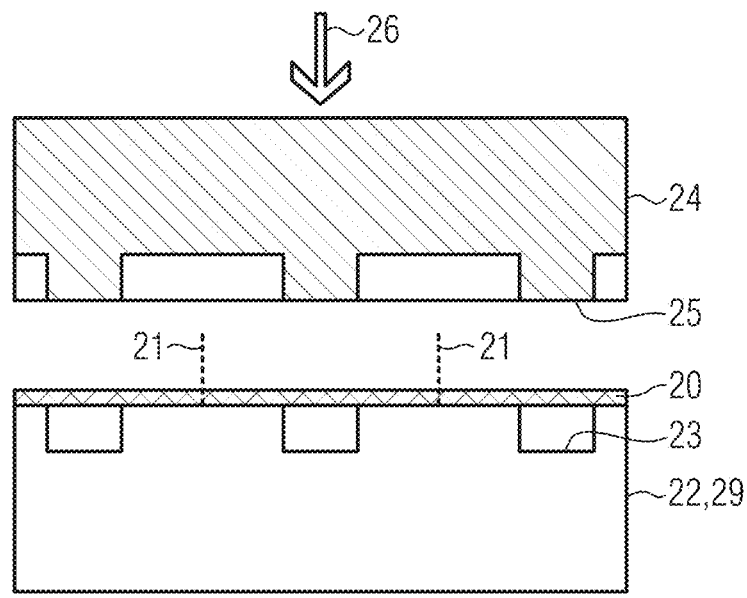
Figure 2D:
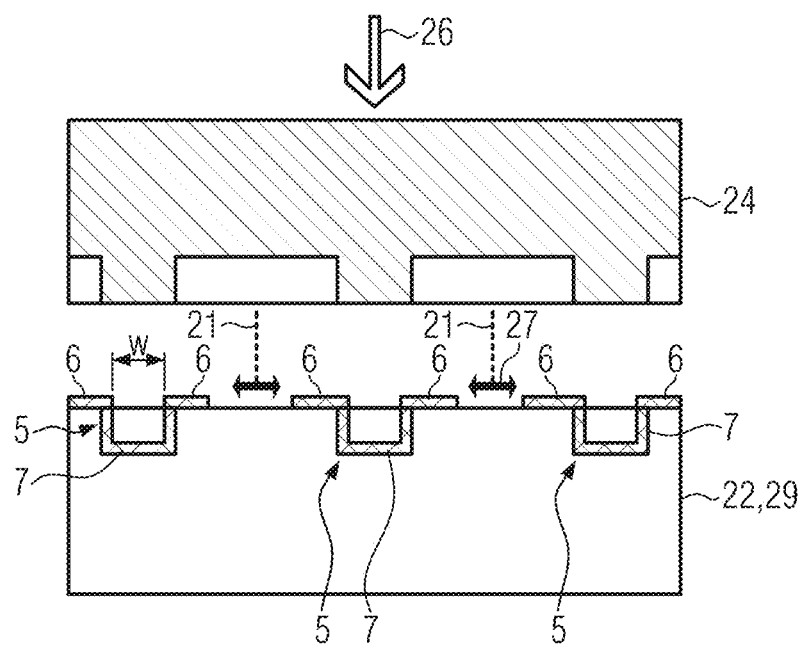
Figure 2E:
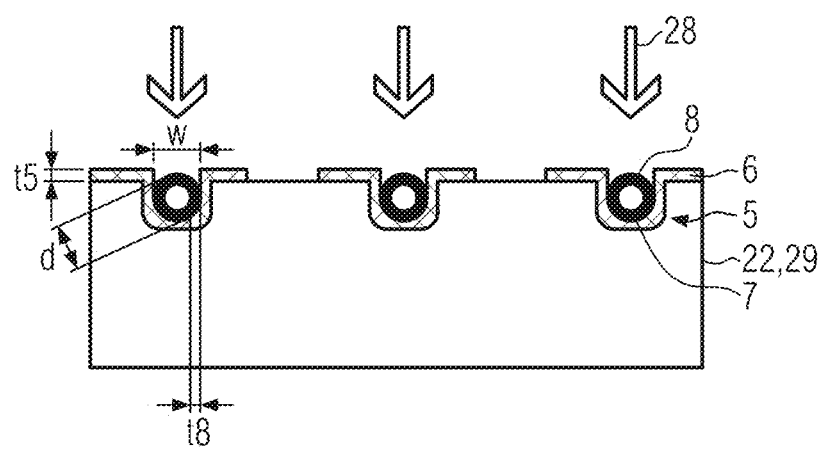
Figure 2F:
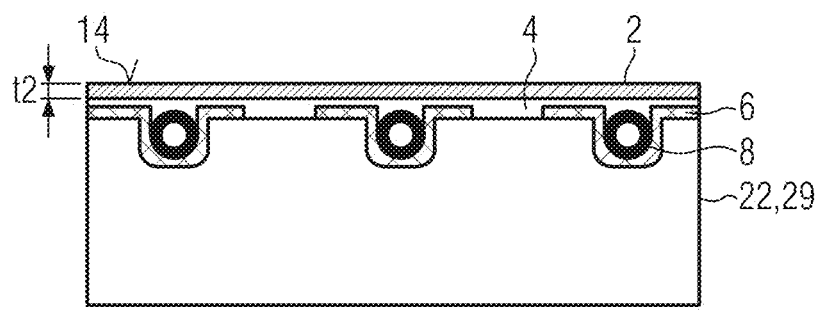
Figure 2G:
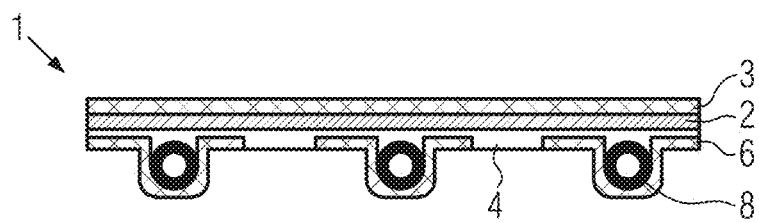
Figure 3A:
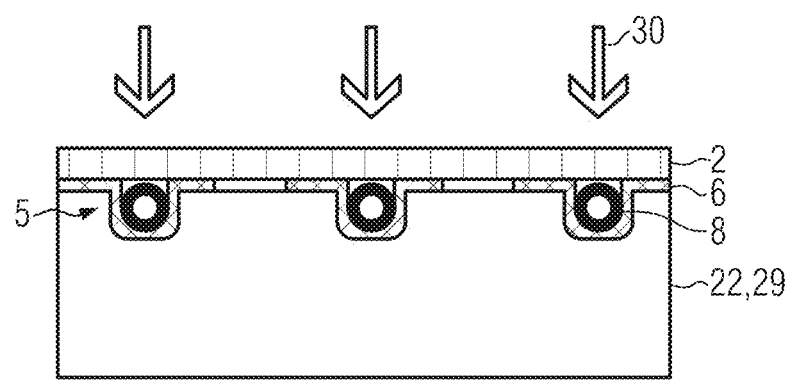
Figure 3B:
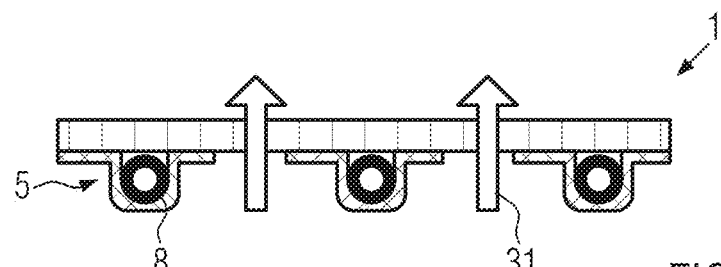
Figure 4A:
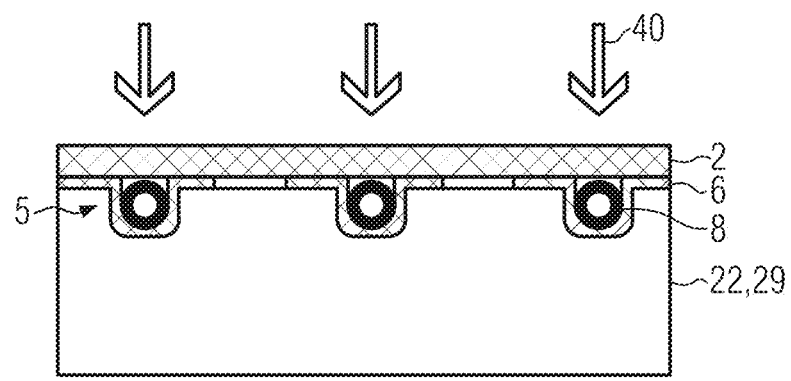
Figure 4B:
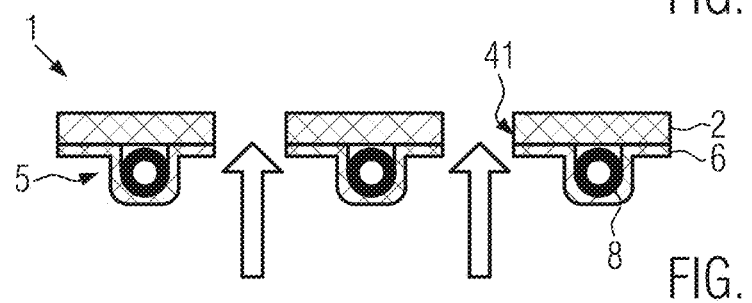
Figure 5A:
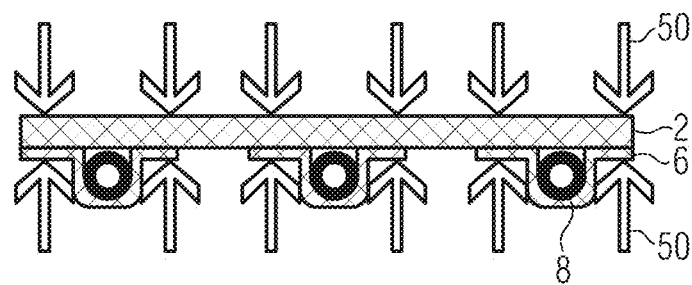
Figure 5B:
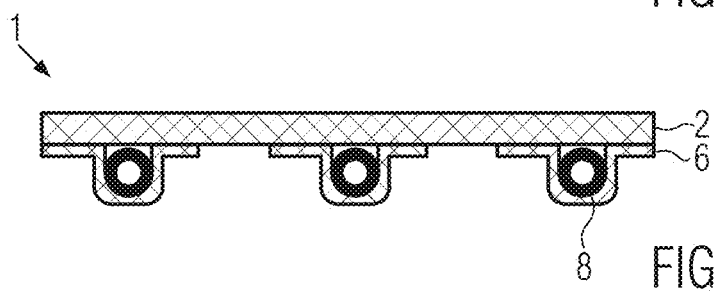
Figure 6A:
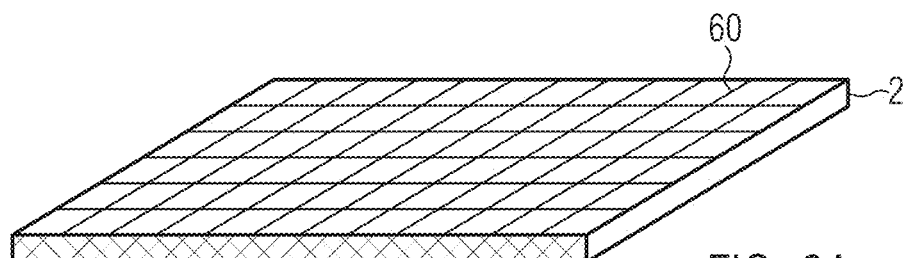
Figure 6B:
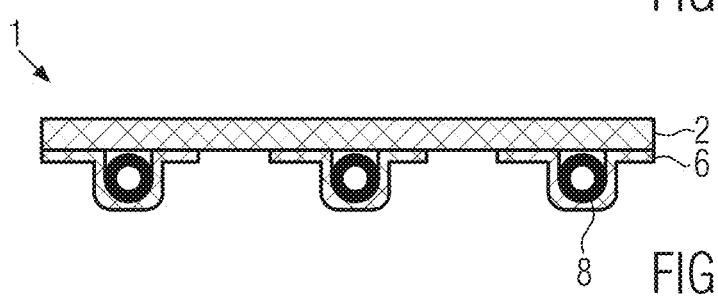
Figure 7:
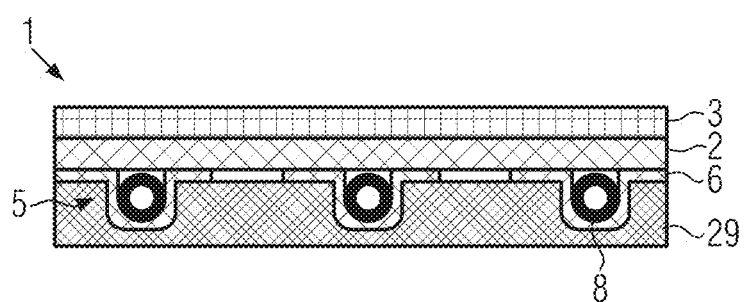
Figure 8:
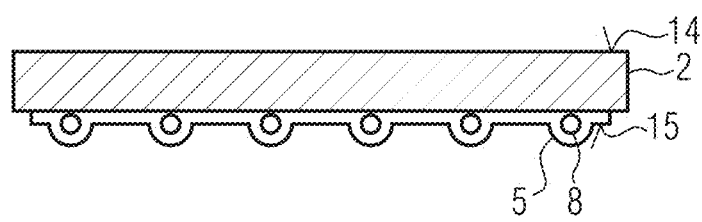
Figure 9:
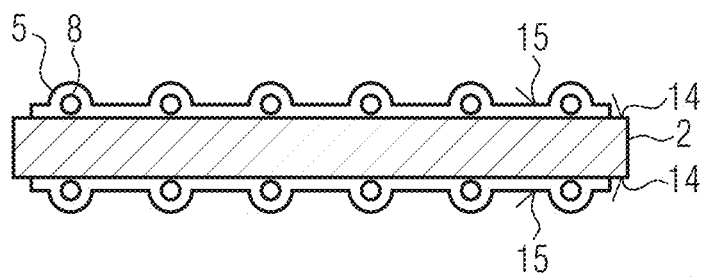
Figure 10:
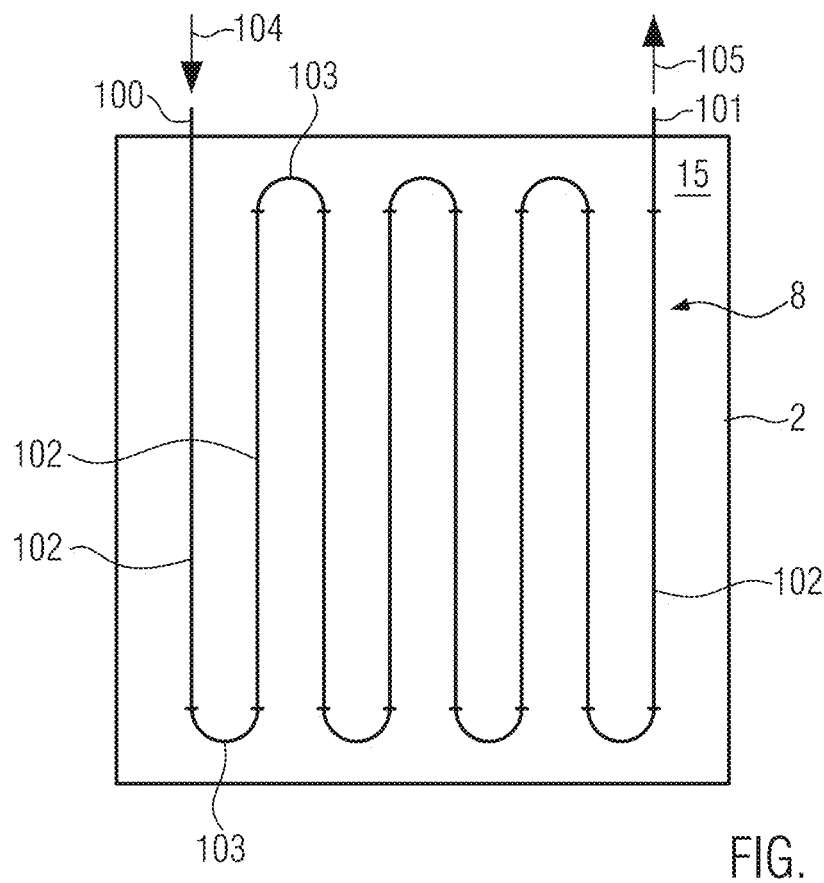
Figure 11:
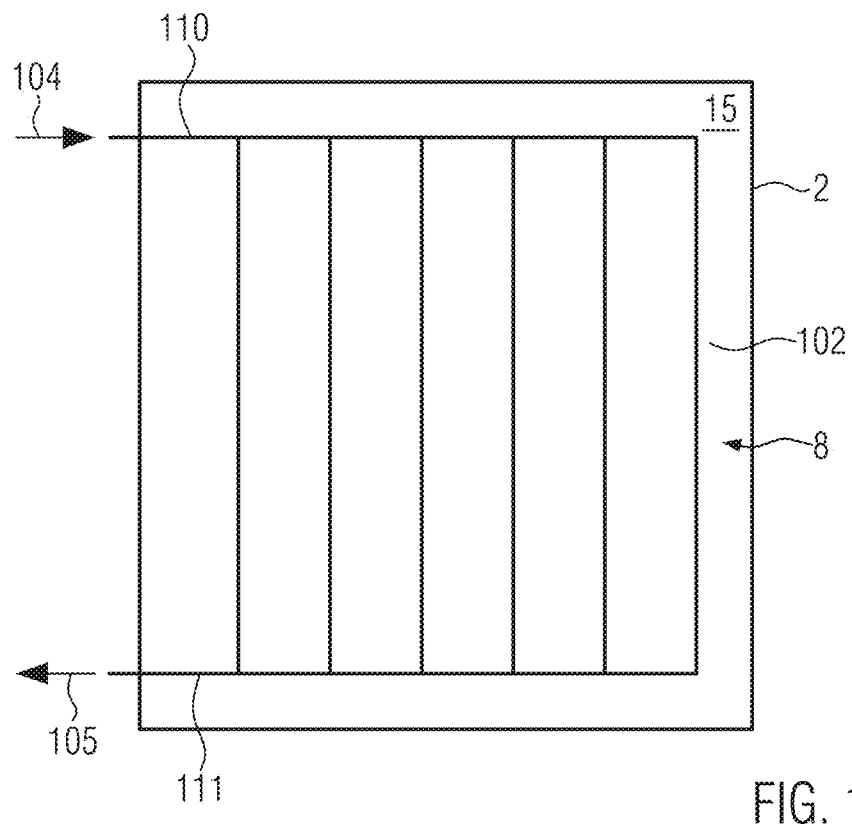
Figure 12:
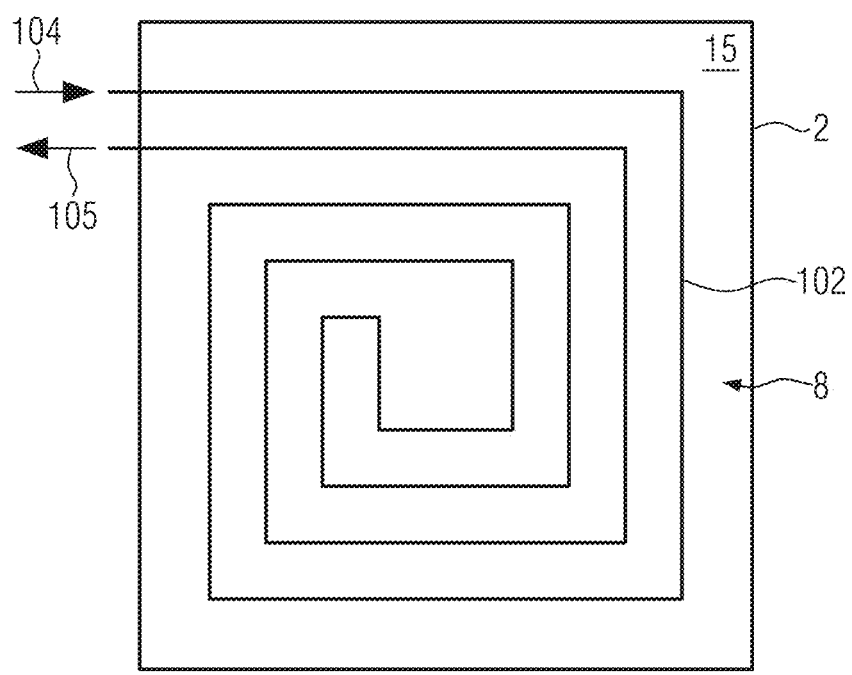
Figure 13B:
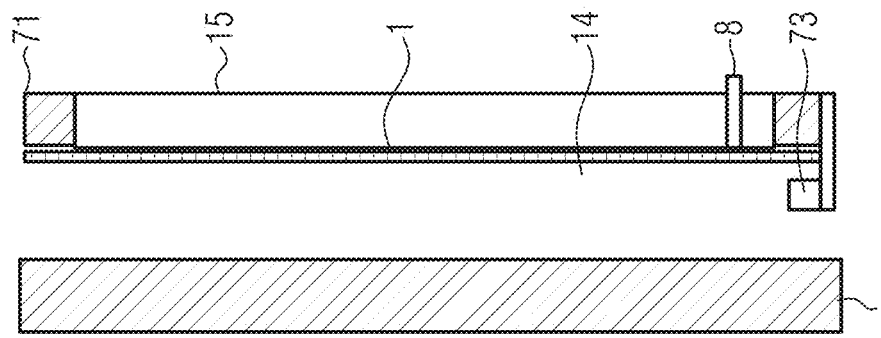
Figure 13A:
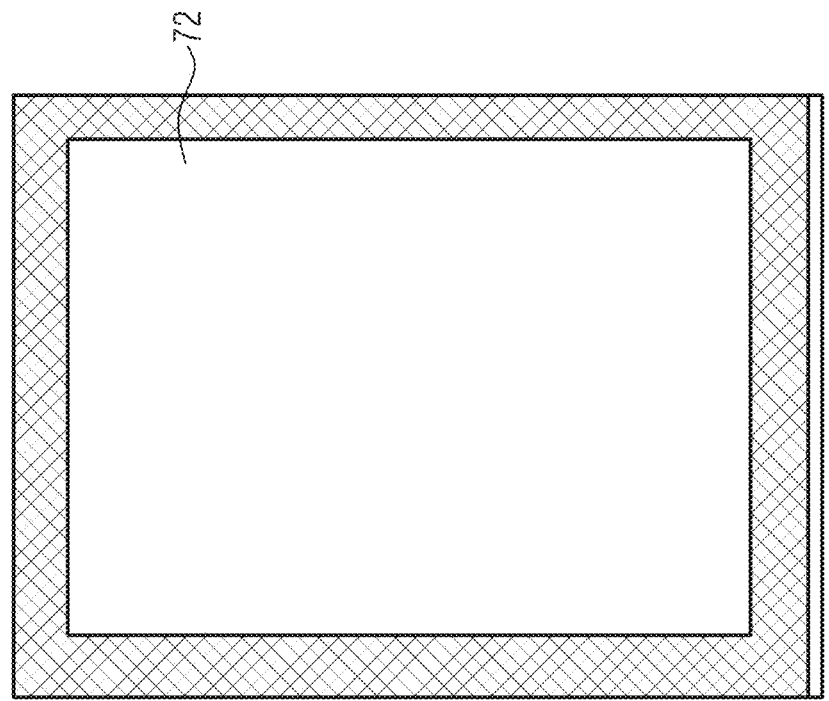
Figure 14:
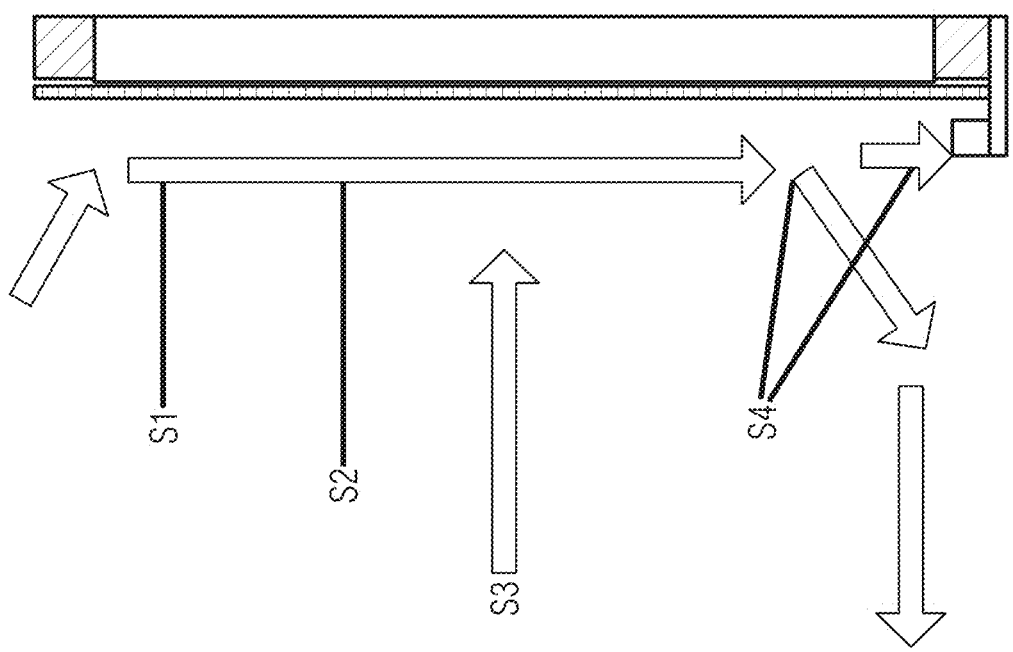

In the following, the invention is explained using the embodiments shown in the drawings as examples. The drawings show schematically:

FIG. 1 a section of a heat exchanger element according to an embodiment of the invention in a cross-sectional view, FIGS. 2A to 2G steps of a manufacturing process of a heat exchanger element according to an embodiment of the invention in cross-sectional views, FIGS. 3A and 3B a step of a manufacturing process of a heat exchanger element and a heat exchanger element according to an embodiment of the invention in cross-sectional views, FIGS. 4A and 4B a step of a manufacturing process of a heat exchanger element and a heat exchanger element according to an embodiment of the invention in cross-sectional views, FIGS. 5A and 5B a step of a manufacturing process of a heat exchanger element and a heat exchanger element according to an embodiment of the invention in cross-sectional views, FIGS. 6A and 6B a heat conductor for a heat exchanger element and a heat exchanger element according to an embodiment of the invention in a perspective or cross-sectional view, FIG. 7 a heat exchanger element according to an embodiment of the invention in a cross-sectional view, FIG. 8 a heat exchanger element according to an embodiment of the invention in a cross-sectional view, FIG. 9 a heat exchanger element according to an embodiment of the invention in a cross-sectional view, FIG. 10 a heat exchanger element according to an embodiment of the invention in a plan view, FIG. 11 a heat exchanger element according to an embodiment of the invention in a plan view, FIG. 12 a heat exchanger element according to an embodiment of the invention in a plan view, FIG. 13a a building panel according to an embodiment of the invention in a plan view, FIG. 13b a building panel according to an embodiment of the invention in a cross-sectional view, FIG. 14 a functional principle of a building panel according to an embodiment of the invention in a cross-sectional view, and FIG. 15 the Magnus formula.

An embodiment of a heat exchanger element is explained below (FIG. 1).

A heat exchanger element 1 has a heat conducting body 2. In this embodiment, the heat conductor 2 is a homogeneous aluminium part with a high thermal conductivity of, for example, approx. 235 W/m*K. However, the invention is not limited to this. In this embodiment, the heat conductor 2 is plate-shaped and rectangular, especially in plan view, and thus has two main surfaces and four edge sides. A main surface of the heat conductor 2 is defined as a heat transfer surface 14, the opposite main surface as a mounting surface 15. A coating 3 is arranged on the heat transfer surface 14 of the heat conductor 2. In this embodiment, the coating 3 is a black colour and thermally highly emissive. A duct 5 with a heat transfer fluid pipe 8 embedded in it is arranged on the mounting surface 15 of the heat conductor 2 by means of a heat-conducting adhesive 4. The duct 5 is approximately Ω-shaped in cross-section and has a channel-shaped locating section 7 as well as two tabs 6 connected to the side of the locating section 7. In this embodiment, duct 5 is also a homogeneous aluminium part. The heat transfer fluid pipe 8 is circular in cross-section. The heat transfer fluid pipe 8 has an interior space 9 which is filled with a heat transfer medium during operation. The heat transfer medium is a gas or a liquid and in particular water or water mixed with an antifreeze agent such as glycol. Antifreeze agents usually not only have the property that they lower the melting point, but also raise the boiling point, which extends the range of application of such a fluid both in the cold and in the hot area.

FIG. 1 shows heat or cold flows 11, 12, 13 in such a way that heat or cold is removed from the heat transfer medium (fluid) in the heat transfer fluid pipe 8 and transferred to the surroundings of the heat exchanger element 1. A cold flow is a heat flow in the opposite direction. The heat exchanger element 1 can thus be used as a heating element or a cooling element. If the heat exchanger element 1 is used as a cooling element, heat from the surroundings of the heat exchanger element 1 is dissipated via the heat transfer medium in the heat transfer fluid pipe 8.

As shown above, the heat transfer fluid pipe 8 is embedded in heat-conducting contact in the locating section 7 of duct 5. Heat-conducting contact with the heat-conducting body 2 is also provided via the heat-conducting adhesive 4 as well as the proximity to the heat-conducting body 2. Thus, the heat transfer fluid pipe 8 is surrounded on all sides by a heat contact surface 10, which enables a directly conducting heat transfer from the heat transfer fluid pipe 8 to the locating section 7 of the duct 5 as well as to the heat transfer body 2.

Furthermore, a convective heat flow 11 can take place via the surfaces adjacent to the side of the locating section 7 and the heat thus transported can be absorbed at these surfaces. Heat absorbed via the wall of the locating section 7 is also conducted into the tabs 6 of the duct 5 and directly conductively transferred by these tabs into the heat conducting body 2 (conductive heat flow 12). Via the thermally highly emissive coating 3, the heat absorbed from the mounting side 15 and conducted through the heat conduction body 2 to the heat transfer surface 14 is transferred to the environment in the form of heat rays 13.

On the other hand, a warm area, for example, which on the side of the coating 3 is connected to the heat transfer fluid pipe 8 via the mounting surface 15, can be cooled via the heat exchanger element 1 by absorbing excess heat from the environment at the heat transfer surface 14.

In this embodiment, the heat transfer fluid pipe 8 is made of plastic, preferably cross-linked polyethylene (PEX). In this embodiment, the heat transfer fluid pipe 8 is designed as a capillary tube with a wall thickness of approx. 0.8 mm and an inside diameter of approx. 2.5 mm to 3.0 mm, and in particular approx. 2.9 mm.

It goes without saying that the heat exchanger element 1 is not only limited to the cut-out shown in FIG. 1, but can also have a large number of adjacent ducts 5 distributed over the mounting surface 15 with a heat transfer fluid pipe 8 embedded in them (FIGS. 8 to 12).

In one embodiment, the heat transfer fluid pipe 8 has a large number of straight, parallel sections 102 which are connected to one another by reverse sections 103 in order to form a serpentine or meander-shaped heat transfer fluid pipe 8 (FIG. 10). The first and last straight section 102 is provided with a flow connection piece 100 for a heat transfer fluid flow 104 and a return connection piece 101 for a heat transfer fluid return 105. The straight sections 102 are included in the ducts 5 described above (not shown in FIG. 10), while the reverse sections 103 lie freely above the mounting surface of the heat-conducting body 2. In this embodiment, the straight sections 102 are designed in one piece with the reversing sections 103 as well as the flow connection piece 100 and the return connection piece 101. This allows the heat transfer fluid pipe 8 to be preformed and ensures the tightness of the heat transfer fluid pipe 8 over its entire length.

As a variant to this embodiment, curved duct sections can also be optionally provided for the reverse section 103 in order to further optimise the heat transfer.

In another variant, the straight sections 102 and reverse sections 103 can be designed separately. This type of design can also enable compact transport of the individual parts.

In another variant, the straight sections 102 can be connected at one end to a flow distributor section 110 and at another end to a return distributor section 111 (FIG. 11).

In another variant, the heat transfer fluid pipe 8 can also run helically on the mounting surface 15 of the heat conductor 2 (FIG. 12).

In another variant, the heat conductor 2 can have a heat transfer fluid pipe 8 on both sides (FIG. 9). In this variant, both main sides of the heat conductor 2 have both a heat transfer surface 14 and a mounting surface 15.

In design variants, the heat conductor 2 can be made of a different material such as another metal and can also be non-homogeneous. For example, the heat conductor can also be made of copper, steel or another metal or an alloy. Preferably, however, the heat conduction body is made of a highly thermally conductive material.

In design variants, the coating 3 can also be a fleece, an electrochemical or other coating or can also be omitted, as the requirements of the application dictate. The coating 3, however, is preferably thermally highly emissive, i.e. it has a high radiant or absorptive capacity for heat transferred from the heat conduction body 2.

In design variants, the thermally conductive adhesive 4 may be replaced by another adhesive or another type of connection. For example, the connection between the tabs 6 of the duct 5 and the heat-conducting body 2 can be made in a form-fitting manner using connecting elements such as rivets, pins or the like, by soldering, spot welding or friction welding.

The heat transfer fluid pipe 8 can also be square ring-shaped, hexagonal ring-shaped, octagonal ring-shaped or similar in cross-section. In other versions, the heat transfer medium can also be a refrigerant, an oil or another fluid.

In a method for manufacturing a heat exchanger element, a foil 20 is first provided in a first step (FIG. 2A). The foil 20, for example, can be made of aluminium.

In a second step, the foil 20 is provided with a perforation 21 (FIG. 2B). The perforation 21 forms parallel lines of dot or line shaped holes and can be produced, for example, by a punching process or by a rolling die.

In a further step, the foil 20 provided with perforation 21 is placed on a template 22, which is arranged opposite a punch 24 with a pressing direction 26 (FIG. 2C). Different sequences are possible: the foil 20 can be placed on the template 22 arranged opposite the punch 24, or the template 22 can be moved into a machine frame under the punch 24 after the foil 20 has been placed, or the punch 24 can be moved over the template 22 after the foil 20 has been placed. The template 22 has parallel grooves 23 of approximately rectangular cross-section. The grooves 23 have the same distance from each other as the lines of the perforation 21 of the foil 20. The foil 20 is placed on the template 22 in such a way that the lines of the perforation 21 run approximately in the middle between the grooves 23. The punch 24 has projections 25 which are shaped and arranged to complement the grooves. In this embodiment, the projections 25 have a roughly rectangular cross-section. They are arranged exactly above the grooves 23. The projections 25 are slightly smaller in cross-section than the grooves 23.

In a further step, the punch 24 is closed in the pressing direction 26 and retracted again (FIG. 2D). When closing the punch 24, the projections 25 of the punch 24 dip into the grooves 23 of the template 22 and take the foil 20 with them in such a way that the foil 20 tears at the perforation 21 so that foil strips form. A central part of the foil strips is pulled into the grooves 23, while lateral parts of the foil strips slide on the template 22 (sliding direction 27). The foil strips formed in this way form the later ducts 5 of the heat exchanger element, with the parts drawn into the grooves 23 each forming the locating section 7 and the parts remaining on the surface of the template 22 forming the tabs 6. This step gives the locating sections 7 an opening width w.

In a further step, a heat transfer fluid pipe 8 is pressed into the locating sections 7 (FIG. 2E, pressing direction 28). The heat transfer fluid pipe 8 is made of plastic or metal (e.g. aluminium, copper or an alloy). In this step, the heat transfer fluid pipe 8 can have individual pipe sections or be a continuous line with reverse or distributor sections at the ends, as described in embodiments above (FIGS. 10, 11, 12). A wall thickness t8 of the heat transfer fluid pipes 8 may correspond to a wall thickness t5 of the ducts 5, or may be slightly or significantly larger (FIG. 2E). However, wall thicknesses can also be measured using suitable design criteria such as, but not limited to, heat transfer, heat conduction, weight and strength. Preferably, the wall thickness t5 of the ducts is about 50 μm. An outer diameter d of the heat transfer fluid pipes 8 can correspond to the opening width w of the ducts 5 or be slightly larger in order to achieve a certain clamping effect in such a way that the heat transfer fluid pipe 8 is held in the locating sections 7.

In a further step, a thermally conductive adhesive 4 is applied to the exposed surfaces of the heat transfer fluid pipes 8, ducts 5 and template 22 and a heat conductor 2 of wall thickness t2 is pressed on (FIG. 2F).

Then a coating 3 is applied to the exposed surface of the heat conductor (heat transfer surface 14 in FIG. 2F) and the template 22 is removed (FIG. 2G). This completes the heat exchanger element 1.

The template 22 can be a carrier component 29 which remains on the heat exchanger element. However, the finished heat exchanger element can also be separated from the template 22 later, whereby the template 22 can be a lost auxiliary component or a permanent part of a tool device.

In one variant of the method, after the ducts 5 have been formed, the template 22 is removed and replaced by a second template. In this state, the heat transfer fluid pipe 8 is then pressed in. In this variant, the template 22 may be made of a hard material, such as steel or hard plastic, and the second template may be made of a soft or at least softer material, such as a foam plate or a rubber-elastic material. In this variant, if the opening width w of the locating section 7 of the duct 5 is smaller than the outer diameter d of the heat transfer fluid pipe 8, the second template can yield when the heat transfer fluid pipe 8 is pressed in and return to the previous shape at the point of the opening so that the heat transfer fluid pipe 8 is elastically clamped in the duct 5. It goes without saying that in this case the second template can remain on the heat exchanger element 1 as carrier component 29.

As an alternative to perforating the foil 20, foil strips can also be produced by cutting the foil 20 placed on the template 22 into strips or punching it (using the punch 24 if necessary). Alternatively, foil strips can be prepared in advance and placed on the template 22. As an alternative to placing on the template 22, the foil 20 or prepared foil strips can also be picked up by the punch 24 (e.g. by vacuum, electrostatic effect, fluid adhesion or the like) and placed over the template 22. With the latter alternative, suitable means must be used to ensure that the punch 24 is easily detached from the foil 20 after the ducts 5 have been formed, without moving or damaging it.

The explanations given in FIG. 1 for the heat exchanger element 1 can be accepted for heat conductor 2 and coating 3 as well as for all other components of the heat exchanger element 1. All other modifications, variants, alternatives and options described above or further below can also be applied, unless excluded for physical reasons.

The heat conductor body 2 was described above as a homogeneous aluminium component. However, other metals such as copper or an alloy can also be used. The heat conductor 2 is preferably in the form of foil.

In another embodiment, which is a variant of the embodiment described first, the heat conductor body 2 is designed in such a way that it is permeable to media such as air or liquids, for example as a metal or plastic grid. In the manufacturing process, the heat conduction body 2 can be pressed onto the ducts 5 and heat transfer fluid pipe 8 in the template 22 (FIG. 3A, pressing direction 30). After removing the template 22, a convective heat flow 31 can occur through the grid of the heat conductor 2 (FIG. 3B). The convective portion can be increased by the free spaces. In this variant, the heat exchanger element 1 can be used, for example, but not only, with thermally activated expanded metal grid ceilings or for flat heat exchangers in water, soil, liquid media, façade areas, etc. In addition to heat supply and discharge, the grid can also be used to maintain the distance under the pipes and offers the possibility of acoustic improvement through acoustic absorbers behind it. The grid can also be a subsequently or previously perforated or punched, heat conducting or non heat conducting sheet metal or plastic part. If the template 22 is also permeable for a medium, it can also remain on the heat exchanger element 1 as carrier component 29.

In a further embodiment, which is a variant of the embodiment described first, the heat conduction element 2 is designed as a micro- or coarsely-perforated metal sheet. In the manufacturing process, the heat conduction body 2 can be pressed onto the ducts 5 and heat transfer fluid pipe 8 in the template 22 (FIG. 4A, pressing direction 40). After removing the template 22, a convective heat flow 31 can occur through hole 41 of the heat conductor 2 (FIG. 4B). The convective portion can be increased by the ventilated spaces and enlargement of the surface. In this variant the heat exchanger element 1 can be used, for example, but not only, for thermally activated pipes in facade constructions or in ice reservoirs, ceiling areas or plastered or cast into walls or ceilings (e.g. in concrete). If the template 22 is also permeable for a medium, it can also remain on the heat exchanger element 1 as carrier component 29.

In a further embodiment, which is a variant of the embodiment described first, the heat conduction element 2 is joined in the manufacturing process without adhesive to the ducts 5 and heat transfer fluid pipe 8 in the template 22 (FIG. 5A, pressing direction 50, FIG. 5B). Bypassing the adhesive can be achieved, for example, but not only, by press joining or forming the aluminium. Optionally an adhesive heat conducting paste can be applied. The adhesive as a potential source of failure can be avoided by force-locking and/or form-fit joining.

In another embodiment, which is a variant of the embodiment described first, the heat conductor body 2 has a perforation 60 (FIG. 5A). The perforation 60 can, for example, be a cross perforation in rectangular or otherwise useful form for free forms of the heat transfer fluid pipe 8 (FIG. 5B). This also allows or facilitates individual shapes.

In another embodiment, which is a variant of the embodiment first described, the heat conductor 2 has a selective coating 3 (FIG. 7). The coating 3 can, for example, be applied by adhesive, sputter or other coating methods. The coating 3 can be applied with adsorbent or absorbent materials such as zeolite or silica gel to use heat or cold. This makes it possible, for example, to implement cost-effective, e.g. heat-driven cooling machines. The coating 3 can also be designed to selectively influence physical properties of the surface, such as the emission behaviour of resistance to substances or aggressive atmospheres.

Due to large pipe cross-sections and a physical limitation of the thermal conductivity of the materials, it was necessary in previous systems to select high material thicknesses.

The approach of the present invention is to reduce the pipe cross-section by using cost-efficient capillary tube mats. Thus the material thickness of the heat conduction plates can be reduced from approx. 2 mm down to 0.05 mm, and heat dissipation can be considerably improved by the small spacing of the tubes (heat transfer fluid pipe 8) of 1-5 cm. Due to the small distance between the capillary tubes, a physical and material optimum of heat conduction and material input is achieved.

For the production of the heat exchanger element 1, the metal or foil-like material can be coated on both sides or on one side with an adhesive in order to achieve an optimum thermal coupling between the capillary tube and the surface later on. The adhesive layer fills any gaps that may occur and optimises the heat transfer through the connection with the capillary tubes. The foil material can be coated with adhesive, which increases the degree of prefabrication and simplifies processability and reliability in the production process.

The use of a relatively thin aluminium or metal layer makes it possible to use material and cost-effective, foil-like and easy-to-process material. To shape the sheet metal strips, an additional processing step is carried out by pressing them directly onto an insulating element of an insulating or separating material or a template (22, 29 in FIGS. 2C-2F and others) into a foamed, slotted or pre-formed groove (23 in FIG. 2C). This is done with a defined counter press mould (punch 24 in FIGS. 2C, 2D). In order to compensate for the resulting elongation and thus prevent uncontrolled tearing of the material, the separating layer is perforated at the crack point. The perforation is selected so that the material tears apart in a defined manner during the pressing and forming process.

The adhesive-coated foil material is perforated at the middle distance of the capillary tubes. The material tears through the perforation in a controlled manner and can be formed into the grooves required for the capillary tubes. The result is that the approx. 15-1000 µm thick aluminium sheets, coated on both sides with thermally conductive adhesive, are optimally adapted to the grooves and capillary tubes. As an option, the pressed component can then be removed from the counter-press mould without the composite element described.

The capillary tube mat (heat transfer fluid pipe 8) is then pressed into the grooves. In a new pressing process, this is optimally formed on the preformed metal heat-conducting sheet strips. These are located within the previously defined grooves and are therefore optimally coated with a top layer and thermally coupled thereto.

The capillary mats are pulled in, bringing the tubes into position for optimum thermal coupling and bonding.

The tubes pressed into the grooves are then coated on the front with a metal sheet (heat conductor 2). This ensures an almost complete enclosure of the capillary tube by an extremely resource-saving and cost-effective process.

Pressing the drawn-in capillary mat with the adhesive-coated heat-conducting sheets with a heat-conducting plate can create a complete metal sheathing of the slim pipe cross-sections. This process ensures an almost complete enclosure of the slender capillary tubes. This results in a high increase in heat transfer efficiency, especially for flat systems. In combination with a suitable insulating material, a composite component with low weight and low material and cost input can be created.

The metal foil on the surface side can have a thickness of approx. 15-1000 µm. Alternatively, the use of non-woven or organic materials, such as wood, is possible.

The new heat exchanger element can form a heat transfer system containing at least one heat distribution pipe system and heat conduction plates which create a thermal coupling and planar distribution between the fluid carrying system and the heat conduction plate which are coupled together and connected to the pipe system by a separation process during forming. For this purpose, an initial workpiece, such as a foil, can have a perforation for the heat conduction plates before pressing, which tears in a controlled manner during pressing. The heat conduction plates can be glued or welded. Post-forming processes are also possible. The heat exchanger element can be subsequently coated with optical or technical elements. Here, the use of thermally conductive adhesives is advantageous. Combinations with selective absorption and reflection materials are also possible. The heat exchanger element is suitable for integration into solar collector systems as well as into thermal storage concepts.

The heat exchanger element according to the invention has the following advantages, among others:

Low weight: Instead of several mm thick heat conduction plates, a foil about 50 µm thick for example, is sufficient for high efficiency. In this context, high efficiency means low cost and material costs for exchanging heat between a large area and a fluid.

Low material input: The low material thickness causes only little waste.

Fast processing: The adhesive pre-coating and perforation achieve a high degree of prefabrication and a simple technical implementation.

Easy processing: The easy to cut and form sheets are easy to handle and process.

Fast reaction time: The low weight and complete enclosure of the tube surface ensures high transfer efficiency and rapid reaction.

Variable application areas: Large heat transfer surfaces are becoming increasingly important. Conventional systems reach their limits, especially with small temperature differences. The best possible coupling creates a cost-effective and highly efficient system.

The new heat exchanger element can be used in areas where an even and flat heat distribution with high cooling or heating capacity and low difference between fluid and surface temperature is particularly important. The following areas of application are particularly noteworthy:

Solar thermal or PV/solar hybrid modules—for dissipating heat input to the surface;

Cooling and heating blankets for optimum distribution of heat and cold to large surfaces;

Temperature control systems integrated into components, e.g. in concrete components or insulation structures;

Object cooling of batteries, furniture, switch cabinets, computer centres etc.;

High-performance surface cooling of climatic chambers and warehouses;

Heat input and output from thermal, e.g. ice storage or latent heat storage with e.g. paraffin with particularly high power density at low temperature difference;

Waste heat recovery from industrial processes or environmental heat;

Areas in which an efficient, uniform and large-area heat distribution and heat transfer is required.

In the following, a further embodiment is described, where the same elements are provided with the same reference symbols as in the previous embodiment (FIGS. 13a, 13b, 14). The explanations given above apply to the same elements, unless otherwise stated below.

In this embodiment, the present invention comprises a building panel 70, which is mounted on walls of buildings over a large area. The building panel 70 has a heat exchanger element 1, as described in one of the embodiments above, a thermally separated edge bond 71 and a collecting device 73. The heat exchanger element 1, on which the air humidity is to be condensed, has a coating 3, a heat conductor 2, an adhesive 4, a tab 6 and a heat transfer fluid pipe 8. The coating 3 on the heat conductor 2 is surrounded in the building panel 70 by the thermally separated edge bond 71. The building panel 70 is mounted on a house wall at this edge bond 71. The building panel 70 is vertically aligned, while a slight tilt does not significantly restrict function. The collecting device 73 is located below the thermally activated surface 72 and collects the condensed water.

The heat transfer fluid pipe 8 is connected to a heat transfer fluid flow 104 and to a heat transfer fluid return 105. The individual forms and embodiments of this heat transfer fluid pipe 8 have been described in detail above.

The heat transfer surface of the heat conductor 2 is preferably made of a durable material. This can be glass or metal, for example. In this embodiment, the coating 3 has a super-hydrophobic surface due to micro- and nano-structuring. Furthermore, the surface is preferably formed with antibacterial properties, such as a coating with titanium oxide.

The collecting device 73 is designed in such a way that it flows as a channel into a collecting container 74. This collecting container 74 is designed in such a way that the collected water can flow off from there either into a domestic water drain or a water recovery system, or is equipped with a carrier system in such a way that it can be easily transported away and poured out. The collecting container 74 preferably has a capacity of not more than 20 litres, in particular not more than 10 litres and in particular not more than 5 litres.

Preferably, the heat conducting body 2 has three-dimensional structures. This is provided, for example, by a corrugated or zigzag-shaped heat conductor 2.

In a further embodiment, which is a variant of the previously described embodiment, the building panel 70 has a facing wall 75. Preferably, this facing wall 75 is made of gypsum plasterboard. However, it can also consist of an air-permeable fabric stretched over a frame. In order for the room air to reach the heat conduction body 2, there are preferably 2 slots at the top and bottom of the facing wall 75, which is connected to the building in the usual way.

In order to dehumidify the room air, the contact surface is cooled to a temperature below the dew point of the water vapour in the surrounding air by the coolant having a corresponding temperature. It must be ensured that the dew point is dependent on the relative humidity and temperature of the air. In one embodiment, the air is led through the air slots between the facing wall and the heat conductor 2 by convection currents in the air. The water vapour in the air then condenses on the surface 10 of the heat conductor 2. If sufficient water condenses, drops of water form which, from a certain size, run down and thus take even more water with them. Dust particles, bacteria and fungal spores are carried along by the water droplets. The water then collects in a collecting device 73. The temperature of the heat conductor 2 is additionally distributed by the course of the water droplets on the surface. The water in the collecting device 73 then flows off into a collecting container 74 and from there into the water drain of the building.

The invention can be briefly summarised as follows: A heat exchanger element (1) has a heat-conducting body (2) and a heat-transfer fluid pipe (8) which is connected to the heat-conducting body (2) for heat conduction, the heat-transfer fluid pipe (8) being embedded in sections in preferably parallel ducts (5) of heat-conducting material in heat-conducting contact, the ducts (5) having a channel-shaped locating section (7) and two tabs (6) which are connected to the locating section (7), so that the ducts (5) are approximately Ω-shaped in cross-section, and the tabs (6) are connected flat to the heat-conducting body (2) in order to establish the heat-conducting connection of the heat-conducting fluid pipe (8) to the heat-conducting body (2). A method of manufacturing the heat exchanger element (1) is given. Furthermore, a building panel and a method for dehumidifying air are specified.

LIST OF REFERENCE NUMBERS 1 heat exchanger element
2 heat conduction element
3 coating
4 adhesive
5 duct
6 tab
7 locating section
8 heat transfer fluid pipe
9 interior (fluid)
10 heat contact area
11 convective heat flow
12 conductive heat flow
13 emissive heat flow
14 heat transfer surface
15 mounting surface
20 foil
21 perforation
22 template
23 groove
24 punch
25 projection
26 pressing direction
27 sliding direction
28 pressing-in direction
29 carrier component
30 pressing direction
31 heat flow
40 pressing direction
41 perforation
42 heat flow
50 pressing direction
60 perforation
70 building panel
71 edge bond
72 thermally activated area
73 collecting device
74 collecting container
75 facing wall
100 flow connection section
101 return flow connection section
102 straight section
103 reversal/connector section
104 heat transfer flow
105 heat transfer return flow
110 flow distribution section 111 return flow distribution section
d outer diameter of heat transfer fluid pipe
t2 wall thickness heat conductor body
t5 wall thickness duct
t8 wall thickness heat transfer fluid pipe
w opening width duct
S1 Humid air at room heat comes into contact with the cooled surface and drops on to the element.
S2 The air cools to below the dew point temperature.
S3 Absorption of radiant heat
S4 The cooled air flows into the room and the condensate is discharged.

The invention claimed is:

1. A method of manufacturing a heat exchanger element comprising
a heat-conducting body with a heat transfer surface and being made of a flexible foil of aluminum, copper or an alloy thereof, and
a heat-transfer fluid pipe comprising sections arranged with a spacing of 1 to 5 cm between each other, the heat-transfer fluid pipe made of a capillary plastic tube and being heat-conductively connected to the heat conducting body,
wherein the method comprises:
arranging a heat-conductive foil on a template having grooves such that the grooves are covered by the heat-conductive foil;
covering the grooves of the heat-conductive foil with foil strips;
pressing the foil strips into respective grooves in a single pull, the foil strips being configured in width so that, after pressing in, each of the foil strips form a channel-shaped section pressed into the grooves; said foil strips comprising tabs projecting laterally at longitudinal edges of the grooves;
inserting the sections of the heat-transfer fluid pipe into the channel-shaped sections of the foil strips pressed into the grooves; and
connecting the tabs flatly with the heat-conducting body, wherein
the foil strips are formed when pressed into the grooves in said single pull by the heat-conductive foil tearing longitudinally between the grooves at predefined locations, the predefined locations being formed by a weakening produced in the heat-conductive foil before the heat-conductive foil is arranged on the template, or
the foil strips are formed in the heat-conductive foil arranged on the template by a cutting tool.

2. The method according to claim 1, wherein the heat-conductive foil is carried by a pressing tool for pressing the foil strips into the grooves, wherein the pressing tool is arranged on the template, and then pressed into the grooves in said single pull.

3. The method according to claim 1, wherein the tabs are connected to the heat-conducting body via a heat-conducting adhesive or a heat-conducting bonding agent, the adhesive or the bonding agent being applied to the heat-conducting body in advance.

4. The method according to claim 1, wherein the template is made of an elastically flexible material and wherein an opening width of the channel-shaped portions of the foil strips pressed into the grooves is smaller than an outer diameter of the heat-transfer fluid pipe.

5. The method according to claim 1, wherein the template is made of a heat and/or sound insulating material and lies on the heat exchanger element as an insulation board, wherein the heat conductive foil is provided with an adhesive or a bonding agent on a surface facing the template prior to being arranged on the template, thereby forming a connection with the template after the foil strips have been pressed into the respective grooves.

6. The method according to claim 1, wherein the heat-conducting body and/or the foil or foil strips are made of a material selected from the group consisting of: aluminium, copper, an alloy, and composite material.

* * * * *